George W. W. Goodwyn's Filter.
72481
**PATENTED
DEC 24 1867**
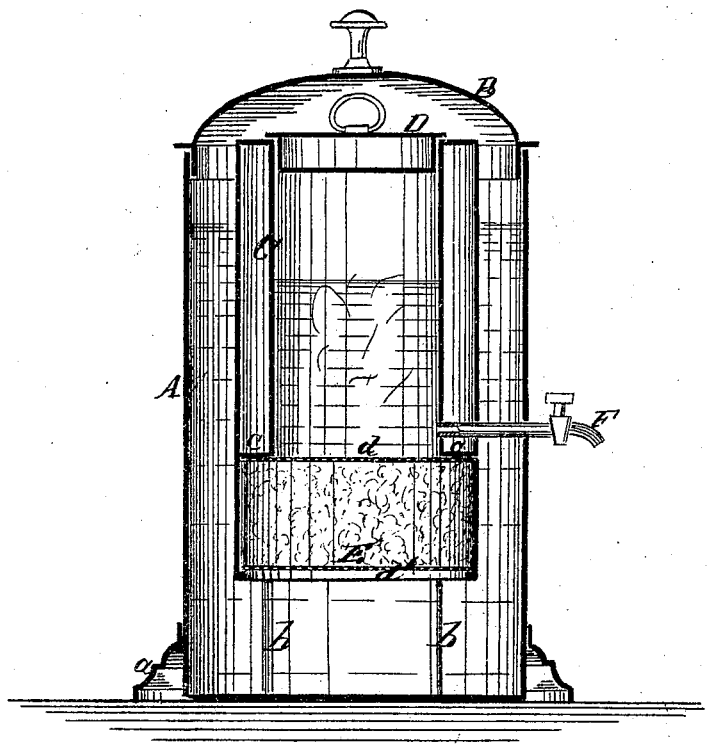
Witnesses.
Thos. Insche
Wm Dean Overell
Inventor
Geo. W. W. Goodwyn
Per Munn & Co
Attorneys

United States Patent Office.

GEORGE W. W. GOODWYN, OF NEW ORLEANS, LOUISIANA.

Letters Patent No. 72,481, dated December 24, 1867.

IMPROVEMENT IN FILTERS.

The Schedule referred to in these Letters Patent and making part of the same.

TO ALL WHOM IT MAY CONCERN:

Be it known that I, GEORGE W. W. GOODWYN, of New Orleans, in the parish of Orleans, and State of Louisiana, have invented a new and improved Filter; and I do hereby declare that the following is a full and exact description thereof, which will enable others skilled in the art to make and use the same, reference being had to the accompanying drawing, and to the letters of reference marked thereon.

This invention consists in a novel arrangement of a filtering-medium with a water-vessel and a vessel to receive the filtered water, as hereinafter fully shown and described, whereby a very portable combination of a filter and water-chamber is obtained, and in connection with a cooler if desired.

The accompanying drawing represents a vertical central section of my invention.

A represents a water-vessel, which may be constructed of sheet metal, and provided with a suitable base, $a$, and a lid or cover, B. This vessel may be of any suitable dimensions, and within it there is placed a smaller vessel, C, constructed with double walls, the space between which may, if desired, be filled with any material which is a poor conductor of heat. This inner vessel is also provided with a lid or cover, D, and is provided with rods or legs or feet, $b$, to keep the filter-chamber E, which is at the bottom of C, some distance above the bottom of the vessel A. The filter-chamber E is equal in diameter to the circle formed by the outer wall of C, and is separated at its top from the space between the two walls of C by a partition, $c$. Within this chamber there is placed any suitable filtering-material, such as charcoal, sand, either or both, or any of the known substances used for such purpose, and this filtering-medium is separated from the interior of the chamber C by a screen, $d$, the bottom of the filtering-medium being also formed by a screen, $d'$. F is a faucet, which passes through the side of the vessel A into the vessel C, just above the filter-chamber.

The water to be filtered is placed in the vessel A, and by virtue of static pressure passes up through the filter-chamber E into C, from which it is drawn, as required, through the faucet F. If desired, ice may be placed in the chamber C.

This device may be economically manufactured, and of quite limited dimensions. It is more especially designed for those sections of the southern States where rain and river water are necessarily used exclusively for drinking purposes.

Having thus described my invention, I claim as new, and desire to secure by Letters Patent—

The combination of the exterior vessel A with the inner vessel C, provided at its lower end with a filter-chamber, E, all constructed and arranged substantially as and for the purpose set forth.

The above specification of my invention signed by me, this first day of August, 1867.

GEO. W. W. GOODWYN.

Witnesses:
S. C. JONES,
M. M. LIVINGSTON.